United States Patent [19]
Koka et al.

[11] Patent Number: 5,781,377
[45] Date of Patent: Jul. 14, 1998

[54] SLIDER WITH PROTECTIVE DLC OR NONHYGROSCOPIC COATING ON THE TRAILING EDGE FACE

[75] Inventors: Venkat R. Koka, Vadnais Heights; Ramesh Sundaram, Eden Prairie, both of Minn.

[73] Assignee: Seagate Technology, Inc., Scotts Valley, Calif.

[21] Appl. No.: 675,377

[22] Filed: Jul. 2, 1996

Related U.S. Application Data

[60] Provisional application No. 60/011,880 Feb. 20, 1996.
[51] Int. Cl.$^6$ .............................. G11B 5/60; G11B 5/187; G11B 21/21
[52] U.S. Cl. ........................................... 360/103
[58] Field of Search .................................. 360/103

[56] References Cited

U.S. PATENT DOCUMENTS

| | | | |
|---|---|---|---|
| 5,023,738 | 6/1991 | Preosil | 360/122 |
| 5,159,508 | 10/1992 | Grill et al. | 360/103 |
| 5,198,934 | 3/1993 | Kubo et al. | 360/104 |
| 5,296,982 | 3/1994 | Terada et al. | 360/103 |
| 5,336,550 | 8/1994 | Ganapathi et al. | 428/216 |
| 5,384,195 | 1/1995 | Bachmann et al. | 428/408 |
| 5,443,888 | 8/1995 | Murai et al. | 428/143 |
| 5,473,486 | 12/1995 | Nepela et al. | 360/103 |
| 5,566,038 | 10/1996 | Keel et al. | 360/103 |

FOREIGN PATENT DOCUMENTS

| | | | |
|---|---|---|---|
| 61-122915 | 6/1982 | Japan | 360/103 |
| 61-122917 | 6/1982 | Japan | 360/103 |
| 57-111827 | 7/1982 | Japan | 360/103 |
| 57-183623 | 11/1982 | Japan | 360/103 |
| 61-206917 | 9/1986 | Japan | 360/103 |
| 63-64684 | 3/1988 | Japan | 360/103 |
| 63-117379 | 5/1988 | Japan | 360/103 |
| 2-239420 | 9/1990 | Japan | 360/103 |
| 3-214478 | 9/1991 | Japan | 360/103 |
| 5-46940 | 2/1993 | Japan | 360/103 |
| 5-182140 | 7/1993 | Japan | 360/103 |
| 6-12615 | 1/1994 | Japan | 360/103 |
| 6-119628 | 4/1994 | Japan | 360/103 |

*Primary Examiner*—Stuart S. Levy
*Assistant Examiner*—William J. Klimowicz
*Attorney, Agent, or Firm*—Westman, Champlin & Kelly, P.A.

[57] ABSTRACT

An improved magnetic head slider is disclosed. The slider includes an air bearing surface and a trailing edge face. A magnetic transducer located at the trailing edge face end of the slider is encapsulated in alumina. A coating of nonhygroscopic material covers at least portions of the alumina to form at least portions of the trailing edge face.

8 Claims, 1 Drawing Sheet

SLIDER WITH PROTECTIVE DLC OR NONHYGROSCOPIC COATING ON THE TRAILING EDGE FACE

BACKGROUND OF THE INVENTION

The present application claims the benefit of earlier filed U.S. Provisional application Ser. No. 60/011,880, entitled SLIDER WITH PROTECTIVE DLC OR NON-HYGROSCOPIC COATING ON THE TRAILING EDGE FACE filed on Feb. 20, 1996.

The present invention relates to magnetic disc storage devices, and more particularly, to a magnetic head slider with a protective diamond-like carbon (DLC) or nonhygroscopic coating on the trailing edge face to improve the reliability of magnetic storage devices.

In magnetic recording rigid disc storage devices, reading and writing are accomplished by transporting read and write transducers, located at the trailing edge faces of sliders, in close proximity to the discs. The read and write transducers are embedded in an alumina matrix. Alumina encapsulates the transducers and maintains their structural integrity during manufacturing processes and during use. The air bearing surface of the slider that faces the magnetic disc is typically covered with a thin layer of DLC. For example, see Grill et al. U.S. Pat. No. 5,159,508 entitled "Magnetic Head Slider Having a Protective Coating Thereon," which is herein incorporated by reference. As is known in the art, this layer is provided to enhance the tribological performance of the slider/disc interface. In addition, the DLC coating decreases the read/write transducer sensitivity to electrostatic damage (ESD) and corrosion.

One problem with prior art magnetic sliders relates to the fact that the alumina which surrounds the read/write transducers is hygroscopic. When exposed to high humidities, alumina tends to absorb moisture. In sliders, when exposed to high humidity, the overcoat alumina layer becomes susceptible to moisture absorption. Swelling of the alumina which encapsulates the transducers can result in cracking of the pole-tips. Cracked pole-tips render read and write transducers inoperable. Furthermore, when the alumina swells excessively, it can protrude beyond the air bearing surface. During subsequent use, this can result in the alumina contacting the disc. Ultimately, the protruding alumina will either wear or chip away. In either case, the reliability of the head/disc interface will be impacted adversely.

Therefore, there is a need for an improved magnetic head slider which reduces the damage commonly caused by swelling of alumina and thereby improves the reliability of the magnetic data storage system.

SUMMARY OF THE INVENTION

An improved magnetic head slider is disclosed. The slider includes an air bearing surface and a trailing edge face. A magnetic transducer located at the trailing edge face end of the slider is encapsulated in alumina. A coating of nonhygroscopic material covers at least portions of the alumina to thereby form at least portions of the trailing edge face.

In a first embodiment of the present invention, the nonhygroscopic material is a diamond like carbon material. In other embodiments, the non-hygroscopic material is a metal or a ceramic material. In some preferred embodiments, yet other surfaces of the slider are covered with the nonhygroscopic material coating in order to prevent the alumina from swelling in high humidity.

DETAILED DESCRIPTION OF THE PREFERRED EMBODIMENTS

Figure 1:
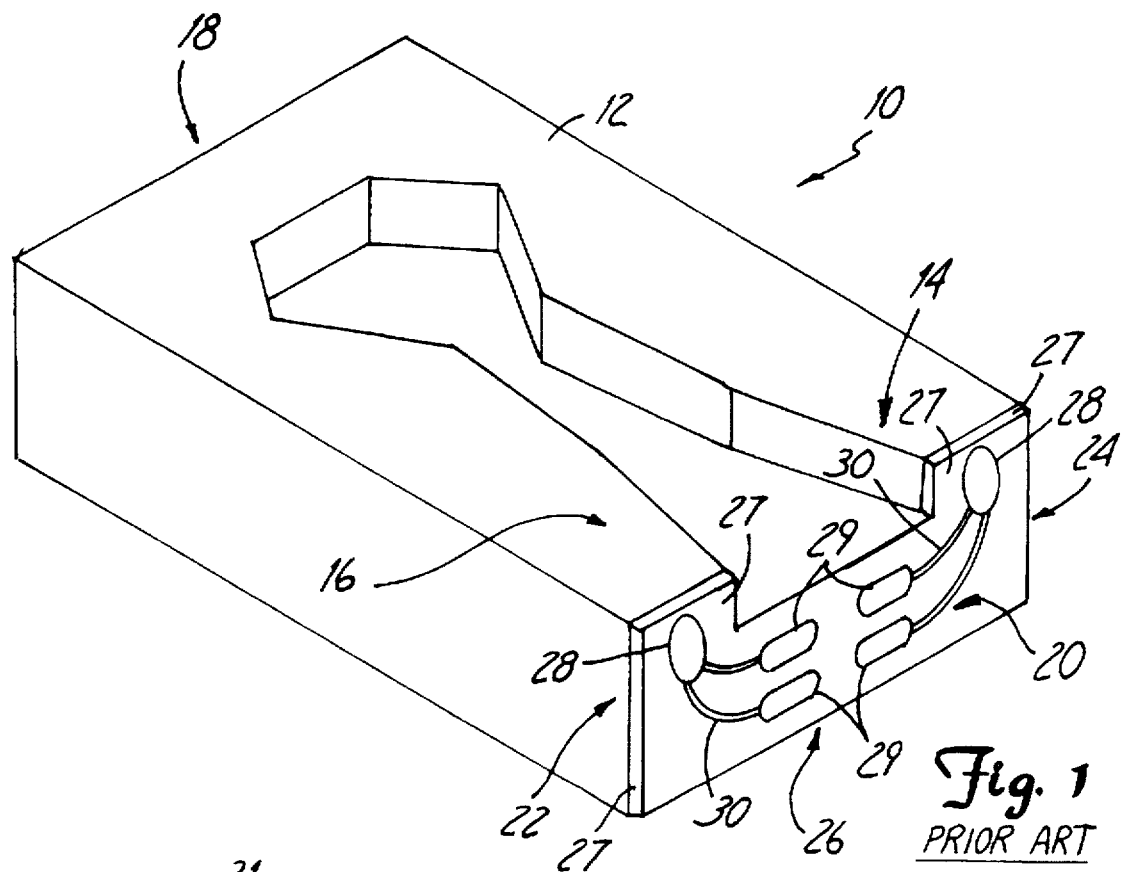
FIG. 1 is a diagrammatic bottom view in perspective of a magnetic data head slider of the type known in the art with which the present invention can be used.

FIG. 1 is a diagrammatic bottom view in perspective of slider 10 of the type known in the art which carries magnetic data heads or transducers for use in a magnetic disc data storage system. Slider 10 is intended to represent a generic slider design. The specific design features illustrated are not intended to limit the scope of the invention in any way. Slider 10 includes bottom surface or air bearing surface (ABS) 12, rails 14 and 16 which make up part of ABS 12, leading edge face 18, trailing edge face 20, side edge faces 22 and 24, and top face or surface 26. Typically, ABS 12 is oriented substantially parallel to top surface 26, while faces or surfaces 18, 20, 22 and 24 are oriented substantially perpendicular to surfaces 12 and 26 to form a generally rectangular-shaped slider. ABS 12 of slider 10 faces the surface of a magnetic storage disc as slider 10 flies above the disc. Typically, the junction of trailing edge face 20 and ABS 12 is closest to the surface of the magnetic storage disc during operation.

Magnetic data heads or transducers 28 are located on trailing edge face 20 at positions corresponding to rails 14 and 16 of slider 10. Magnetic heads 28 can include inductive and/or magnetoresistive (MR) data heads. Although one of magnetic data heads 28 is illustrated as being located at each of rails 14 and 16, in preferred embodiments, slider 10 can include a single magnetic data head located at only one of rails 14 and 16. Alternatively, an inductive writer data head and an MR reader data head can be located adjacent one another at the trailing edge end of one of rails 14 and 16. FIG. 1 is intended to represent any and all of these common configurations. Magnetic data heads 28 are coupled to bond pads 29 through electrical connections 30.

Typically, alumina 27 is used to encapsulate magnetic data heads 28 to maintain their structural integrity during the manufacturing processes and during use. Alumina 27 surrounding the magnetic data heads in sliders is hygroscopic. When exposed to high humidities, the alumina tends to absorb moisture, resulting in cracking of the pole-tips of magnetic data heads 28. Cracked pole-tips render read and write transducers inoperable. Further, if the absorbed moisture causes alumina 27 to swell excessively, it protrudes beyond ABS 12 toward the surface of the magnetic storage disc. During subsequent use, the protruding alumina can contact the surface of the magnetic storage disc. Ultimately, the protruding alumina will either wear or chip away. In either case, the reliability of the head/disc interface is impacted adversely.

Figure 2:
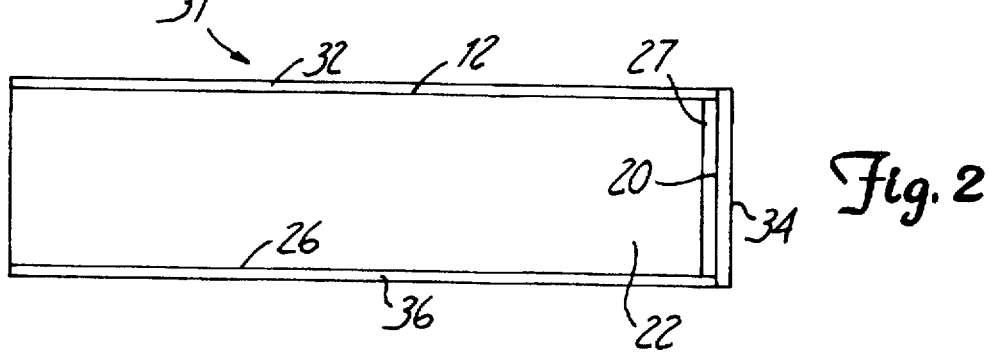
FIG. 2 is a diagrammatic upside down side view of a magnetic data head slider in accordance with the preferred embodiments of the present invention.
Figure 3:
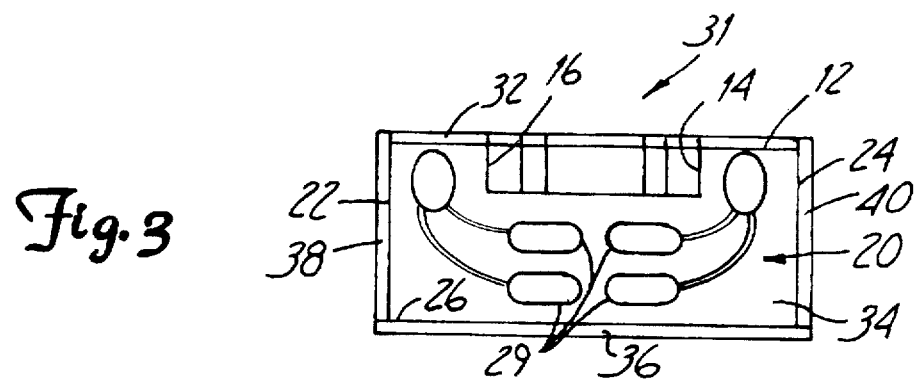
FIG. 3 is a diagrammatic upside down end view of the magnetic data head slider illustrated in FIG. 2 which further illustrates features of the present invention.

FIGS. 2 and 3 are diagrammatic upside down side and end views, respectively, of magnetic slider 31 in accordance with preferred embodiments of the present invention. FIGS. 2 and 3 are illustrated as "upside down" in order to correspond to the illustrated orientation of slider 10 shown in FIG. 1. Of course, sliders can operate in a variety of orientations so long as the ABS faces the surface of the corresponding magnetic disc. For purposes of illustration, slider 31 of the present invention is identical to prior art slider 10 except as discussed below. As is known in the art, slider 31 preferably includes DLC coating 32 on at least portions of ABS 12 to enhance the tribological performance of the slider/disc interface, and to decreases the read/write head or transducer sensitivity to ESD and corrosion. Alternatively stated, DLC coating 32 becomes at least portions of the ABS.

Slider 31 of the present invention differs from prior art slider 10 in that it includes protective coating 34 on alumina 26 at the trailing edge face end of the slider. Alternatively stated, protective coating 34 becomes at least a portion of the trailing edge face of the slider. Protective coating 34 on trailing edge face 20 is preferably a layer of non-hygroscopic material so that it does not absorb moisture when exposed to high humidity. Protective coating 34 preferably covers substantially all of the trailing edge face end of slider 31 except for the area occupied by bond pads 29 so that electrical connections to magnetic heads 28 can still be made. Of course, other portions of the trailing edge face end of the slider can be left uncovered by protective coating 34 as well. It is most important that the areas of the trailing edge face end of the slider closest to magnetic heads 28 and ABS 12 be covered. However, in preferred embodiments, all of the trailing edge face end of the slider is covered except for the area occupied by bond pads 29. By providing the non-hygroscopic material coatings at the trailing edge face of the slider, the alumina surface exposed to environmental moisture is drastically reduced, thereby decreasing the likelihood of the alumina swelling.

In addition to trailing edge face 20, protective coatings of non-hygroscopic material can be used to cover one or more other surfaces of slider 31 in order to further minimize the likelihood that the pole tips of the magnetic data heads will crack, and in order to prevent alumina from swelling beyond ABS 12 in a direction toward the magnetic disc. Specifically, protective coating 36 can be used to cover top surface 26, protective coating 38 can be used to cover side edge face 22, and protective coating 40 can be used to cover side edge face 24. Of course, it can be alternately stated that these protective coatings become these faces or surfaces. These protective coatings can be used to cover the corresponding surfaces in their entirety, or just partially. If used to cover only part of their corresponding slider surfaces, it is most beneficial to cover portions of those slider surfaces which are near the alumina used to encapsulate magnetic data heads 28.

Preferably, all of protective coatings 34, 36, 38 and 40 are made of the same non-hygroscopic material. These protective coatings can be any of a variety of non-hygroscopic materials including DLC, metal materials, and ceramic materials. Preferably, the protective coatings will be no thicker than around 100 Å to 200 Å thick in order to minimize the increase in weight of slider 31. However, thicker coatings can also be used. The benefit of using DLC as the non-hygroscopic coating material is that, if a DLC coating is being used on ABS 12, it is convenient to use DLC as the protective coating material for one or more of surfaces 20, 22, 24 and 26.

The non-hygroscopic protective coatings can be deposited on their corresponding surfaces using known thin film deposition techniques. The invention can be implemented in a cost effective manner by adding process steps at the wafer level and not at the slider level. Further, as the coating thickness needed for the invention is likely to be no more than a few hundred Å thick, neither process time nor machining operations are likely to be affected. Following is a description of a process which can be used to achieve the invention. First, the overcoat alumina is flat lapped to expose contact pads/studs. Next, the DLC (or other non-hygroscopic coating material) is deposited over the entire wafer. Then, a combination of photo processes and ion mill/etch are used to selectively remove the coating from over the pads/studs. Note that this process applies to end bond pad type sliders as illustrated in FIGS. 1–3. A modified, but simpler, process flow can be used for top bond pad type sliders.

Although the present invention has been described with reference to preferred embodiments, workers skilled in the art will recognize that changes may be made in form and detail without departing from the spirit and scope of the invention.

What is claimed is:

1. A magnetic head slider for supporting a magnetic head above a magnetic disc, the magnetic head slider comprising:

a slider structure having leading and trailing end surfaces and an air bearing surface, wherein the slider structure further comprises a top surface substantially parallel to the air bearing surface, a first side surface substantially perpendicular to the air bearing surface and to the trailing end surface, and a second side surface substantially parallel to the first side surface, the magnetic head slider further comprising a diamond like carbon coating on at least one of the top surface, the first side surface and the second side surface alumina encapsulating the magnetic head provided on the trailing end surface of the magnetic head slider, and a diamond like carbon coating on at least portions of the air bearing surface and on at least portions of the trailing end surface, wherein the diamond like carbon coating on at least portions of the air bearing surface and on at least portions of the trailing end surface act to minimize swelling of alumina of the magnetic head slider toward the magnetic disc, wherein the diamond like carbon coating on the trailing end surface of the slider structure has a thickness of less than about 200 Å so that an increase in weight of the magnetic head slider caused by the diamond like carbon coating on the trailing end surface is minimized, and wherein the diamond like carbon coating on the trailing end surface covers substantially all of the trailing end surface except for portions of the trailing end surface corresponding to locations of bond pads.

2. A magnetic head slider for supporting a magnetic head, the magnetic head slider comprising:

an air bearing surface;

a trailing edge face; a magnetic head provided on the trailing edge face; alumina encapsulating the magnetic head at the trailing edge face;

a top surface oriented at least partially in a first plane parallel to a second plane of the air bearing surface and perpendicular to a third plane of the trailing edge face;

a first side surface oriented at least partially in a fourth plane perpendicular to the first, second and third planes;

a second side surface oriented at least partially in a fifth plane perpendicular to the first, second and third planes;

a coating of non-hygroscopic material covering at least portions of at least one of the top surface, the first side surface and the second side surface, wherein the portions of the at least one of the top surface, the first side surface and the second side surface which are covered with the non-hygroscopic coating include portions located near the trailing edge face end of the slider; and a coating of non-hygroscopic material covering at least portions of the trailing edge face, wherein the thickness of the coating of non-hygroscopic material is less than about 200 Å;

wherein the non-hygroscopic material on at least portions of the top surface, the first side surface or the second side surface and on at least portions of the trailing edge face act to minimize swelling of the alumina of the magnetic head slider toward the magnetic disc.

3. The magnetic head slider of claim 2, wherein the coating of non-hygroscopic material covering at least portions of the trailing edge face covers substantially all of the trailing edge face except for portions of the trailing edge face corresponding to locations of bond pads on the trailing edge faces, such that the coating of non-hygroscopic material having a thickness of less than about 200 Å becomes the trailing edge face of the magnetic head slider.

4. The magnetic head slider of claim 2, wherein the magnetic head slider supports an inductive magnetic head adjacent the trailing edge face.

5. The magnetic head slider of claim 2, and further comprising a diamond like carbon coating covering at least portions of the air bearing surface.

6. The magnetic head slider of claim 2, wherein the non-hygroscopic material is a metal material.

7. The magnetic head slider of claim 2, wherein the non-hygroscopic material is a ceramic material.

8. The magnetic head slider of claim 2, wherein the non-hygroscopic material is a diamond like carbon material.

* * * * *